(12) United States Patent
Smith et al.

(10) Patent No.: US 7,110,745 B1
(45) Date of Patent: Sep. 19, 2006

(54) MOBILE GATEWAY INTERFACE

(75) Inventors: Steven G. Smith, Roswell, GA (US);
Ralph J. Mills, Jr., Atlanta, GA (US);
Robert H. Willis, Jr., Louisville, KY
(US); Curt Kaloustian, Marietta, GA
(US); Mitchell E. Davis, Palmetto, GA
(US); Roland T. Morton, Jr., Atlanta,
GA (US); Gary J. Dennis, Duluth, GA
(US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 358 days.

(21) Appl. No.: 10/028,271

(22) Filed: Dec. 28, 2001

(51) Int. Cl.
H04Q 7/20 (2006.01)
H04Q 7/38 (2006.01)
H04M 1/00 (2006.01)
H04M 1/66 (2006.01)

(52) U.S. Cl. ............... 455/411; 455/414.1; 455/435.1; 455/456.1; 455/456.2; 455/456.3; 455/550.1; 455/560; 455/563

(58) Field of Classification Search ........ 455/410–411, 455/435.1, 520, 521, 550.1, 552.1, 553.1, 455/567, 569.1, 569.2, 414.3, 423–425, 456.1–456.3, 455/456.5, 456.6, 414.1, 418–420, 433, 440, 455/79, 95, 404.1, 432.2, 556.1–556.2, 517–519, 455/445, 457–459, 466, 557, 560–561, 563, 455/575.9; 709/217–219, 229; 704/236, 704/243, 246–248; 705/8–13; 445/414.1; 379/88.01, 88.02, 88.04
See application file for complete search history.

(56) References Cited

U.S. PATENT DOCUMENTS

| | | | | |
|---|---|---|---|---|
| 5,481,588 A | * | 1/1996 | Rickli et al. ............. | 379/32.01 |
| 5,771,459 A | * | 6/1998 | Demery et al. ............. | 455/517 |
| 5,826,029 A | | 10/1998 | Gore, Jr. et al. | |
| 6,222,829 B1 | * | 4/2001 | Karlsson et al. ............ | 370/329 |
| 6,253,249 B1 | * | 6/2001 | Belzile ...................... | 709/249 |
| 6,430,410 B1 | * | 8/2002 | Staber ....................... | 455/423 |
| 6,600,928 B1 | * | 7/2003 | Ahya et al. ................. | 455/518 |
| 6,604,075 B1 | * | 8/2003 | Brown et al. ............ | 704/270.1 |
| 6,633,900 B1 | * | 10/2003 | Khalessi et al. ............ | 709/202 |
| 6,640,212 B1 | * | 10/2003 | Rosse ............................ | 705/9 |
| 6,678,720 B1 | * | 1/2004 | Matsumoto et al. ........ | 709/204 |
| 2001/0036224 A1 | * | 11/2001 | Demello et al. ............ | 375/220 |
| 2002/0035699 A1 | * | 3/2002 | Crosbie ...................... | 713/201 |
| 2002/0073196 A1 | * | 6/2002 | Westervelt et al. ......... | 709/224 |
| 2002/0103851 A1 | * | 8/2002 | Kikinis ...................... | 709/202 |
| 2003/0028410 A1 | * | 2/2003 | House et al. .................. | 705/9 |

* cited by examiner

OTHER PUBLICATIONS

VoCarta TeleForms Application Server (www.datria.com/products/teleforms/overview.htm).

Primary Examiner—Meless Zewdu
(74) Attorney, Agent, or Firm—Cantor Colburn LLP

(57) ABSTRACT

A mobile gateway interface that enables a supervisor to conduct typical office transactions via a remote device while the supervisor is away from the office. The remote device can be one of several items, including, for example, wireless telephones, interactive pagers, personal digital assistants, laptop computers with wireless modem, and the like. The supervisor uses the remote device to log into the mobile gateway interface. After the authentication process, the supervisor makes a transaction request through the remote device. A transaction server, which is part of the mobile gateway interface, interacts with one or more resources to process or execute the transaction request. The resources can include an intranet, the Internet, and various legacy systems. Preferably, the mobile gateway interface includes one or both voice and front-end data servers that facilitate the authentication process and execution of the transaction request.

25 Claims, 5 Drawing Sheets

KNOWN ART**

MOBILE GATEWAY INTERFACE

FIELD OF THE INVENTION

The present invention relates generally to the field of work force management and, more particularly, to systems and methods that enable supervisors to perform typical office transactions while being away from the office.

BACKGROUND OF THE INVENTION

In most industries in which technicians are dispatched to field locations to provide services to customers, their supervisors are available in home offices to provide them with support, coordinate projects, and perform various office transactions. The supervisors have access in their offices to a number of resources, including various legacy systems, a company intranet, e-mail accounts, the Internet, and the like. Through these resources, the supervisors can perform various transactions, including those associated with the supervision of the technicians. For example, a supervisor may use a dispatch system, which is one of the resources, to determine which technician is closest to a particular field location.

The dispatch system and all such resources become unavailable to the supervisor when the supervisor himself is in the field. The supervisor may be in the field to respond to customer calls, provide training to new technicians, attend meetings, or for other reasons. As the resources are unavailable to him while he is on the road, the supervisor's ability to supervise his technicians becomes severely challenged. Currently, the supervisor must rely on someone else, perhaps another supervisor who is in the office, to obtain the needed information from the office resources.

FIG. 1 is a schematic diagram showing a known method for a supervisor to obtain information from the resources in the office while the supervisor is away from the office. Supervisor 110 is at a field location away from the office at which dispatch system 152 is located. Supervisor 110 needs to know the whereabouts of technician 160. Supervisor 110 uses communications device 120, e.g., a wireless telephone, to call maintenance center 150. During a voice communications session via communication network 130, a colleague of supervisor 110 at maintenance center 150 obtains the name of technician 160 from supervisor 110. The colleague then consults dispatch system 152 from which information associated with technician 160 is obtained. The information may include, for example, the last dispatch time, the GPS coordinates of technician 160's current location, how many jobs technician 160 has been scheduled to perform that day, and so on. The colleague then conveys the information to supervisor 110 during the voice communications session.

On any given day, maintenance center 150 may be flooded with calls from supervisor 110 and hundreds of other supervisors attempting to obtain similar or the same information from dispatch system 152. Thus, the known method often results in significant time wasted by supervisor 110 and his colleagues. This known method is therefore highly inefficient. Accordingly, there is a need for a system and method that would enable supervisor 110 to access resources in the office directly.

SUMMARY OF THE INVENTION

The present invention is a system and method that enables a user (e.g., a supervisor) to conduct typical office transactions on office resources while the user is away from the office. Using a remote device, the user of the invention interacts with the resources in the office through a mobile gateway interface (MGI). The remote device can be any one of several types of devices including, for example, a desktop computer, a wireline telephone, a wireless telephone, a wireless personal digital assistant (PDA), an interactive pager (I-pager), a laptop computer with a wireless modem, and the like.

In one embodiment, the remote device is a telephone. Using the telephone, the user dials a telephone number associated with the MGI. The MGI includes a front-end voice server and a transaction server. The front-end voice server interfaces between the telephone and the transaction server. The front-end voice server interprets a spoken command from the user and translates the spoken command into a transaction request that can be understood by the transaction server. When the transaction server receives the transaction request, the transaction server interacts with various resources in the office. The various resources can include, for example, various legacy systems, a company intranet, e-mail accounts, the Internet, and the like. After the transaction server has executed the transaction request, the transaction server provides feedback to the front-end voice server in response to the transaction request. The front-end voice server translates the feedback into a speech segment that can be heard by the user on the telephone. Thus, through the MGI, the user can perform typical office transactions as if the user were in the office.

Preferably, in addition to speech recognition, the front-end voice server is adapted to perform voice authentication and speech synthesis functions. The front-end voice server authenticates the user based on a voice exemplar previously provided by the user. Using speech synthesis, the voice server provides a menu of operations from which the user can select. By speaking into the telephone the user selects an operation and provides any additional data needed for the operation. Using speech recognition, the front-end voice server prepares a transaction request based on the spoken user input. The transaction request is forwarded to the back-end system resources via the MGI. The back-end system resources respond to the transaction request with a feedback. The MGI forwards the feedback to the front-end voice server. The voice server formats the feedback and outputs the feedback to the telephone. Preferably, the feedback may be a synthesized speech segment that can be reproduced by a speaker of the telephone. Alternatively, the feedback can be represented as text which can be presented on a display of the telephone.

In another embodiment in which the remote device is a computer, PDA, I-pager, or another data processing device, the MGI includes a front-end data server that is coupled with the transaction server. Through the front-end data server, the transaction server interfaces between the remote device and the resources, permitting the user to conduct typical office transactions using the remote device. Like the front-end voice server, the front-end data server is preferably adapted to determine whether the user is an authorized user of the system before access to the transaction server is granted. The authentication process can be performed using one of several methods. For example, the front-end data server can be adapted to recognize certain pre-approved passwords.

In an exemplary system adaptable for a telephone company, the resources can include all legacy systems associated with the telephone company. The exemplary system provides at least the following benefits to the telephone company:

supervisors are available in the field without losing their abilities to perform office transactions using the resources in their offices;

technicians have more access to their supervisors;

increased safety awareness can be obtained among the technicians due to the presence of their supervisors in the field;

increased efficiency can be expected from the technicians due to increased availability of the supervisors in the field;

faster response time to customers can be achieved due to the availability of supervisors to work on field projects; and mentoring opportunities between supervisors and technicians can be increased.

DETAILED DESCRIPTION OF THE INVENTION

Figure 1:
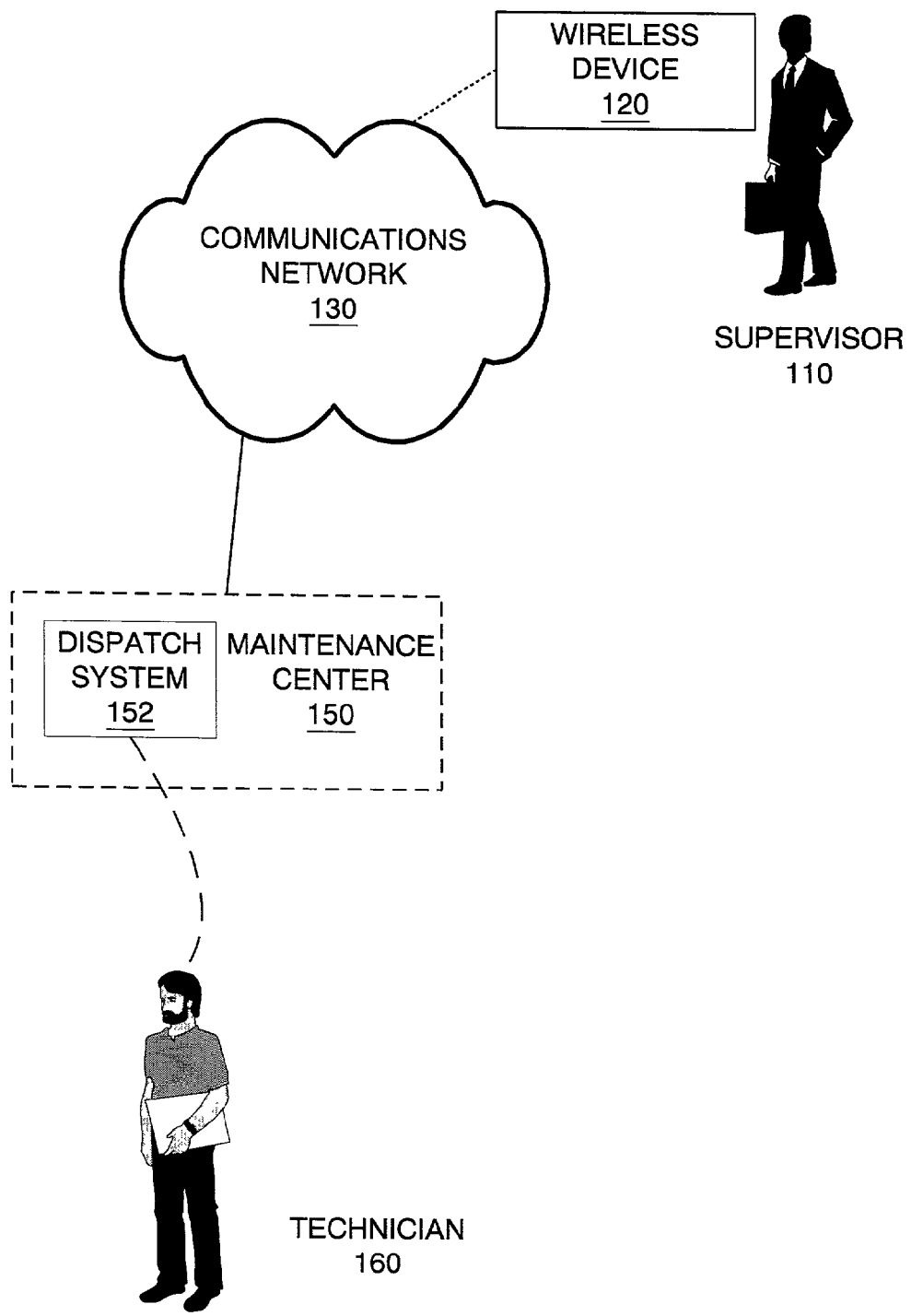
FIG. 1 is a schematic diagram showing a known method that enables a supervisor to obtain information from a legacy system.
Figure 2:
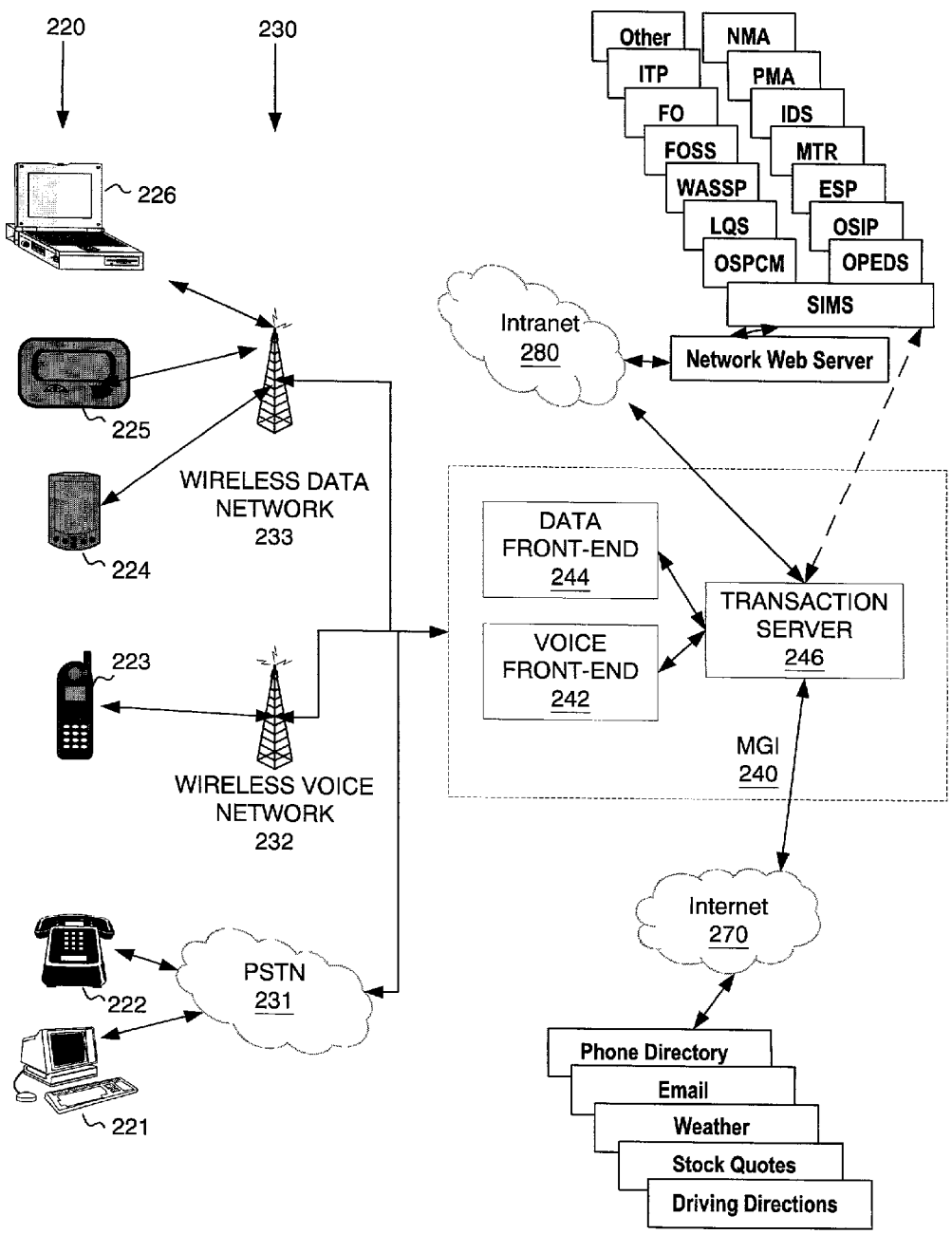
FIG. 2 is a schematic diagram showing a high-level view of the system architecture of an embodiment of the invention.

FIG. 2 is a schematic diagram showing a high-level view of the system architecture of an embodiment of the invention.

Desktop computer 221, wireline telephone 222, wireless telephone 223, PDA 224, I-pager 225, and laptop computer 226 that can be used to implement the invention. Desktop computer 221 and wireline telephone 222 can access MGI 240 via PSTN 231. Wireless telephone 223 can access MGI 240 via wireless voice network 232. PDA 224, I-pager 225, and laptop computer 226 can access MGI 240 via wireless data network 233. Hereinafter, each of desktop computer 221, wireline telephone 222, wireless telephone 223, PDA 224, I-pager 225, and laptop computer 226 is alternatively referred to as remote device 220. Similarly, each of PSTN 231, wireless voice network 232, and wireless data network 233 is hereinafter alternatively referred to as communications network 230.

MGI 240 includes front-end voice server 242, front-end data server 244, and transaction server 246. Transaction server 246 has access to various resources. For example, through Internet 270, a user of the invention can review a telephone directory, manage an e-mail account, learn about the weather conditions, receive stock quotes, obtain driving directions, etc., by using remote device 220. Similarly, through Intranet 280 and its associated network web server, the user can access one or more legacy systems using remote device 220. In the context of a telephone company, the legacy systems can include the following systems:

Security Information Management System (SIMS);
Outside Plant Construction Management System (OSPCM);
Loop Qualification System (LQS);
Work Activity Statistical Sampling Process (WASSP);
Fleet Operations Support System (FOSS);
Fleet Optimizer (FO);
Integrated Technician Performance (ITP);
Network Monitoring and Analysis (NMA);
Proactive Maintenance Administration (PMA);
Integrated Dispatch System (IDS);
Mechanized Time Reporting (MTR);
Employee Scheduling Program (ESP);
Open System Interconnect Platform (OSIP);
Outside Plant Engineering Design System (OPEDS); and the like.

It is noted that without Intranet 280, one or more of the SIMS, OSPCM, LQS, WASSP, FOSS, FO, ITP, NMA, PMA, IDS, MTR, ESP, OSIP, OPEDS, and the like can be adapted to be accessed by transaction server 246 directly, i.e., without going through the network web server.

Figure 3:
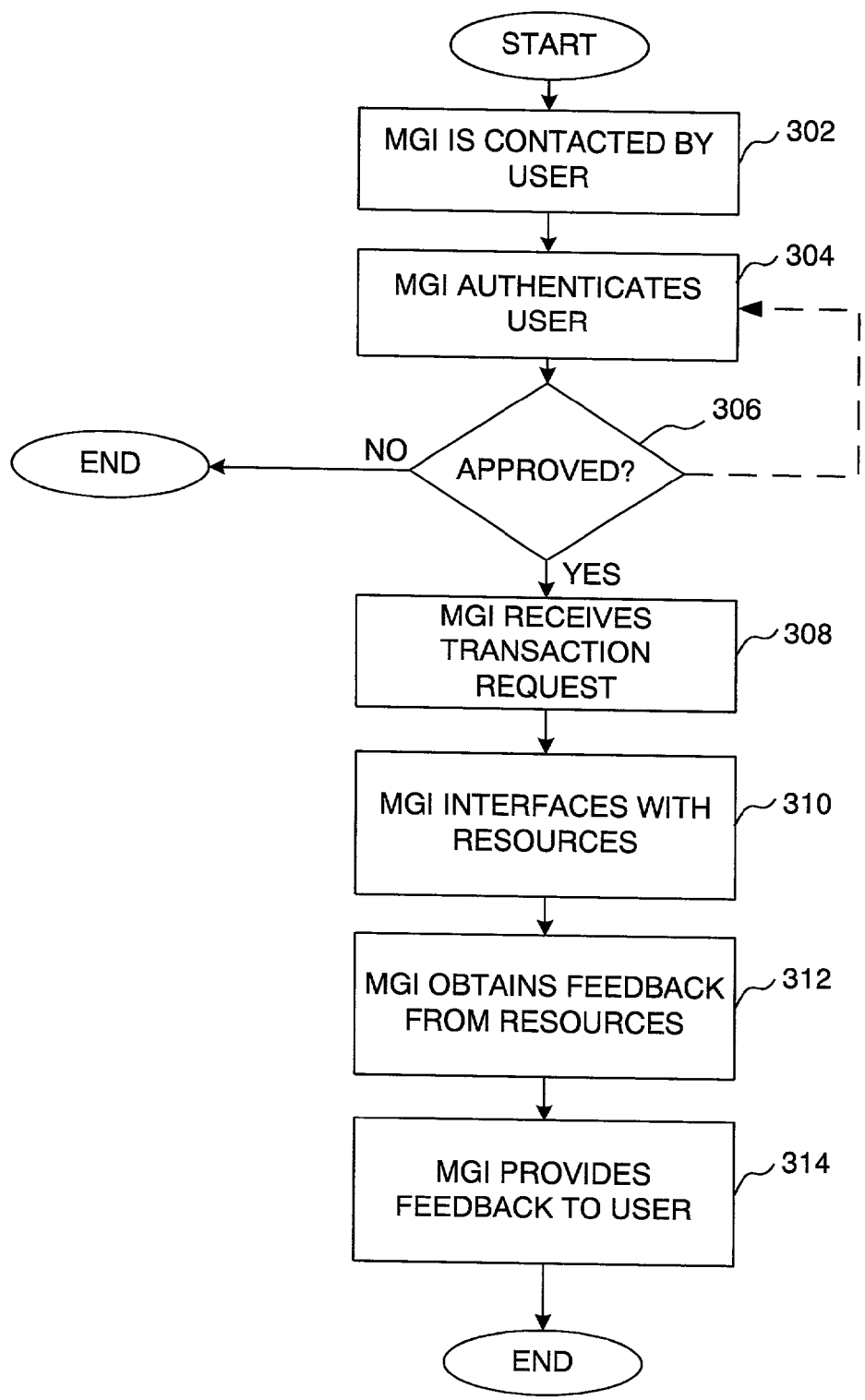
FIG. 3 is a flow diagram illustrating exemplary steps that could be used to implement an embodiment of the invention.

FIG. 3 is a flow diagram illustrating exemplary steps that could be used to implement an embodiment of the invention. To explain and illustrate the invention, FIG. 3 is discussed in connection with the structure shown in FIG. 2. The method of FIG. 3, however, is not to be considered as limited to or constrained by the structure of FIG. 2 or any other structure.

In step 302, a user (e.g., a supervisor) uses remote device 220 (i.e., one of devices 221, 222, 223, 224, 225, 226 or other similar devices) to establish a communications session with MGI 240. Depending on the type of remote device 220 used by the user, one or more of PSTN 231, wireless voice network 232, and wireless data network 233 can be involved in the communications session.

In step 304, MGI 240 authenticates the user. Authentication can be performed in one of several ways. For example, if either wireline telephone 222 or wireless telephone 223 is used to contact MGI 240, the authentication process is performed by front-end voice server 242. MGI 240 can be contacted by, for example, dialing a telephone number associated with MGI 240 using the telephone. Front-end voice server 242 prompts the user to identify himself. Preferably, front-end voice server 242 is a voice-enabled platform that has at least two capabilities. First, front-end voice server 242 can analyze whether the voice of the user matches a known voice exemplar of an authorized user. Second, front-end voice server 242 can associate spoken commands provided by the user with transaction requests, which are then provided by front-end voice server 242 to transaction sever 246.

A different authentication method may be employed. For example, front-end data server 244 may be used to authenticate the user. One authentication process may involve remote device 220 sending identity information associated with the user to front-end data server 244. For example, wireless telephone 223 may send its mobile identification number (MIN) to front-end data server 244. Upon receiving the MIN, front-end data server 244 asks the user to provide a password. The supervisor can enter the password using the keypad of wireless telephone 223. The user is authenticated if the password is in fact associated with the MIN in a database accessible by front-end data server 244. In lieu of the MIN, the user can enter a user ID to identify himself before providing the password.

In step 306, a determination is made as to whether the user is an authorized user of the system. If the user is authenticated as an authorized user, either by front-end voice server 242 or front-end data server 244, or both, the process goes to step 308. Otherwise, the process ends and the user is denied access. It is noted that provisions can be made to permit the user more than one opportunity to login. For example, as shown in FIG. 3 by the dashed arrow connecting step 306 back to step 304, after failing one login attempt, the user may be given another opportunity to return to step 304 to login. Preferably, no more than three attempts are allowed to ensure security.

In step 308, MGI 240 receives a transaction request from the user. Here, if remote device 220 were a telephone (e.g., one of wireline telephone 222 and wireless telephone 223), the user simply provides a spoken command into remote device 220. If the spoken command is recognized by MGI 240 (through front-end voice server 242), a valid transaction request is received by transaction server 246. For discussion purposes, assume that the spoken command is "Locate John Doe," and that John Doe is one of the technicians supervised by the user. It must be noted that provisions can be made to enable the user to enter the command using the keypad of remote device 220.

In step 310, transaction server 246 interfaces with an appropriate element of the resources. For example, through Intranet 280, transaction server 246 can interact with the Integrated Dispatch System, which is a dispatch system that has information about John Doe.

In step 312, transaction server 246 obtains a feedback from the resources. For example, transaction server 246 reviews information available on the IDS to determine the location of John Doe. Based on the review, the feedback from the IDS may indicate that John Doe is located at 123 Maple Avenue.

In step 314, MGI 240 provides the feedback to the user. Front-end voice server 242 translates "123 Maple Avenue" to a voice string before the feedback is transmitted to wireless telephone 223 or wireline telephone 222. Finally, the user receives the desired information over remote device 220. For example, the user hears "John Doe is currently at 123 Maple Avenue."

It must be noted that the above illustration is a simplified, exemplary transaction in which the user only speaks once to obtain the desired information. In most transactions, it may require several interactions between the user and MGI 240 before a transaction request can be successfully responded to. For example, following the establishment of a communications session between remote device 220 and MGI 240, exchanges that occur between the user and MGI 240 may include the following exemplary "conversation."

MGI 240: "Good morning! Please identify yourself."
The user: "Tom Katz."
MGI 240: "Hello, Tom Katz. Please say your password."
The user: "Mickey Mouse."
MGI 240: "I'm sorry. The password you just told me is not recognized."
The user: "Donald Duck."
MGI 240: "How may I help you today?"
The user: "Locate Technician."
MGI 240: "I will search the dispatch system. Please provide the name of the technician."
The user: "John Doe."
MGI 240: "John Doe is currently at 123 Maple Avenue. Would you like to make another transaction?"
The user: "No."
MGI 240: "Good Bye."

Figure 4:
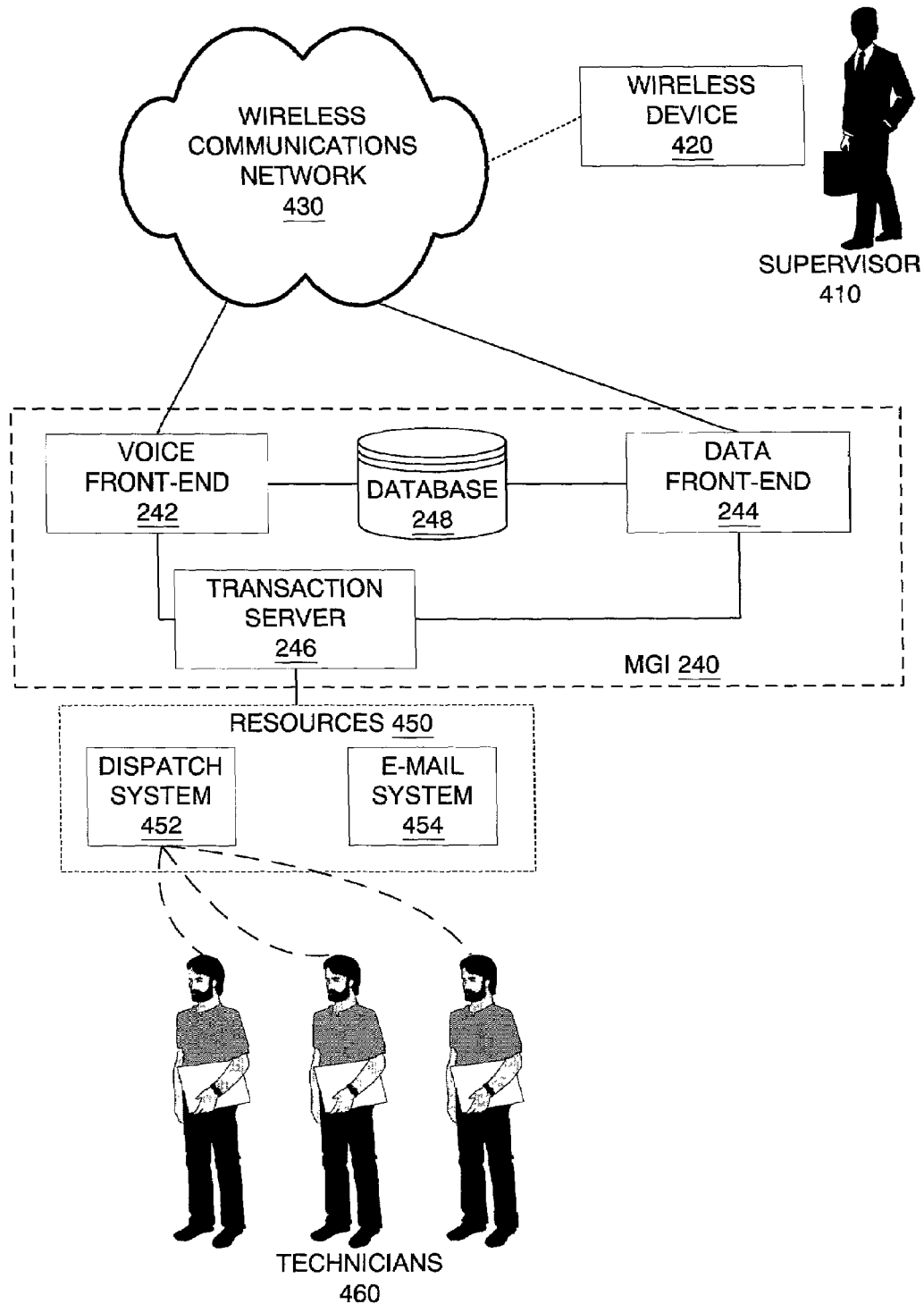
FIG. 4 is a schematic diagram showing the system architecture of a preferred embodiment of the invention.

FIG. 4 is a schematic diagram showing the system architecture of a preferred embodiment of the invention. In this embodiment, the system of the invention includes wireless device 420, wireless communications network 430, MGI 240, and resources 450.

MGI 240 includes front-end voice server 242, front-end data server 244, transaction server 246, and database 248. Transaction server 246 is preferably an XML server. Each of front-end voice server 242 and front-end data server 244 has access to database 248. Database 248 has, among other user information, identity information of authorized users. The identity information may include, for example, user IDs, passwords, and voice exemplars associated with the authorized users.

An exemplary front-end voice server 242 is the VoCarta application of Datria System, Inc. of Englewood, Colo. Preferably, front-end voice server 242 is powered by voice recognition and authentication engines which are available from Nuance Communications of Menlo Park, Calif. An exemplary front-end data server 244 is that which is available Broadbeam Corporation of Princeton, N.J.

Wireless communications network 430 can be either a wireless voice network (if wireless device 420 is a wireless telephone) or a wireless data network (if wireless device 420 is a wireless device other than a wireless telephone), or both.

Supervisor 410 is a user of the invention. Technicians 460 are members of a work force that is associated with supervisor 410. For example, supervisor 410 and technicians 460 may be employees of a telephone company. Technicians 460 are present at various field locations responding to service calls. Supervisor 410, who is normally at the home office of the telephone company, is currently away from the home office. Supervisor 410 is equipped with wireless device 420. Wireless device 420 can be, as stated above, a wireless telephone, an I-pager, a PDA, a computer with a wireless modem, and the like. Preferably, wireless device 420 is a wireless telephone, in which case wireless communications network 230 is a wireless telephone network.

Resources 450 can include any number of computer networks including the Internet, the company's Intranet, and various legacy systems. For discussion purposes, assume that resources 450 include dispatch system 452 and e-mail system 454. As discussed above and as illustrated in FIG. 2, resources 450 can include a much larger number of systems which are accessible to supervisor 410 via MGI 240.

Figure 5:
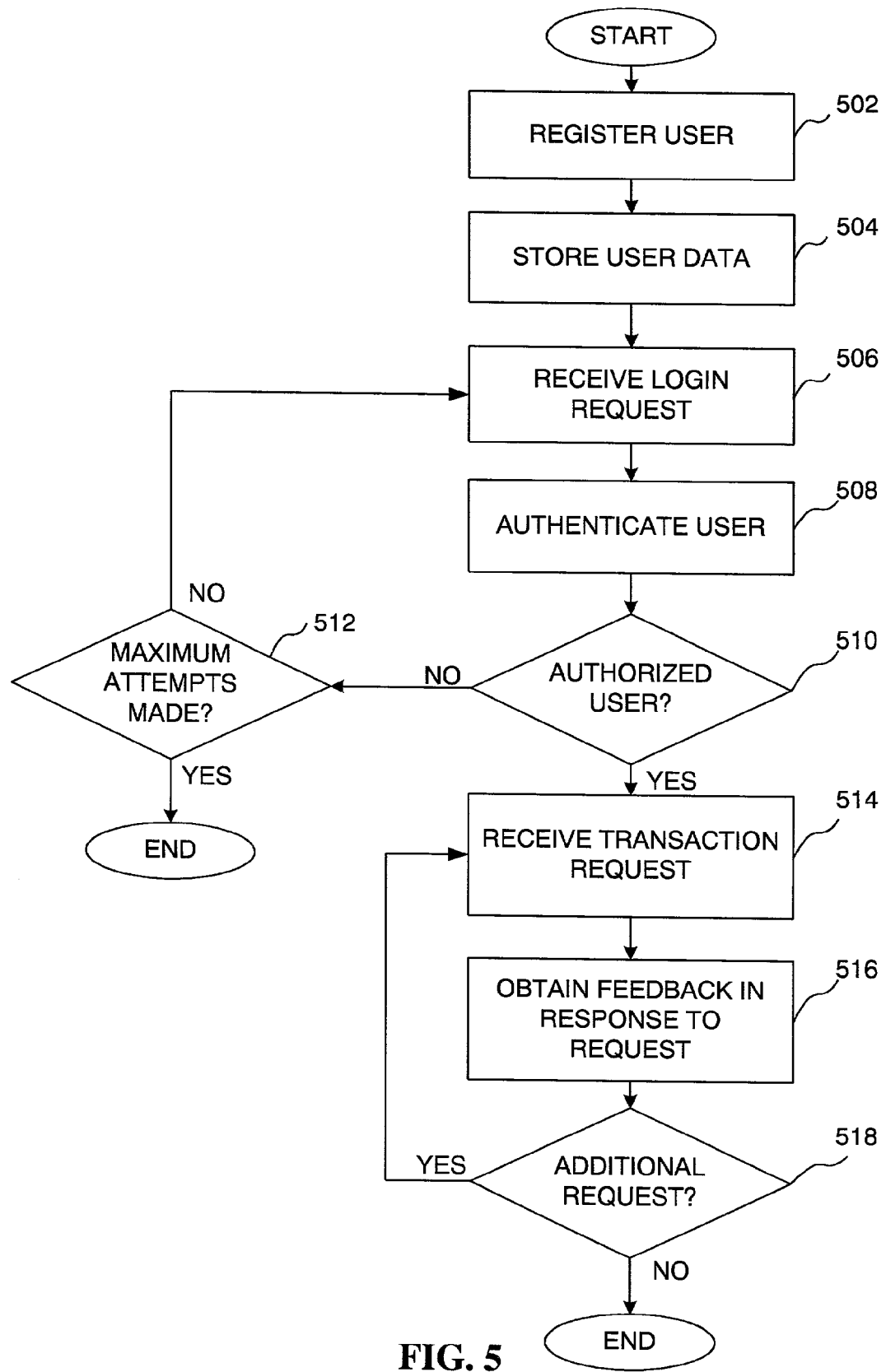
FIG. 5 is a flow diagram illustrating exemplary steps that could be used to implement a preferred embodiment of the invention.

FIG. 5 is a flow diagram illustrating exemplary steps that could be used to implement the preferred embodiment of the invention. To explain and illustrate the preferred embodiment of the invention, FIG. 5 is discussed in connection with the structure shown in FIG. 4. The method of FIG. 5, however, is not to be considered as limited to or constrained by the structure of FIG. 4 or any other structure. For discussion purposes, assume that wireless device 420 is a wireless telephone.

In step 502, authorized users of the invention are registered. An authorized user may be, for example, supervisor 410 shown in FIG. 4. The registration process can include the provision of a user ID to supervisor 410. The user ID is then associated with user information of supervisor 410. The user information can include identity information of supervisor 410 such as, for example, his full name, his department, names of technicians under his supervision, a password, a voice exemplar, the MIN of wireless device 420, etc. Preferably, the user information further includes other information including which elements of resources 450 supervisor 410 is permitted to access remotely using wireless device 420.

In step 504, the information obtained or created in step 502 is stored in a place that is accessible to MGI 240.

Preferably, the information is stored in database 248. Database 248 may be any memory device that can be adapted to store the information so that the information is accessible to front-end voice server 242 and front-end data voice server 244.

In step 506, MGI 240 receives a login request from supervisor 410. Preferably, the login request is received by MGI 240 as soon as a wireless communications session is established between MGI 240 and wireless device 420. Along with or as a part of the login request, the user ID of supervisor 420 is provided to MGI 240. Supervisor 420 can provide his user ID by speaking into wireless device 420 or by keying it in using the keypad of wireless device 420. Alternatively, the MIN of wireless device 420 may be used as the user ID. The MIN can preferably be provided to MGI 240 automatically upon the establishment of the wireless communications session. If the MIN is used as the user ID, precautions should be taken to ensure that supervisor 410 has exclusive use of wireless device 420.

In step 508, MGI 240, through one or both of front-end voice server 242 and front-end data server 244, authenticates supervisor 410 or otherwise determines whether the login request is received from an authorized user. MGI 240 can prompt supervisor 410 to provide a password (by speaking into or entering through the keypad of wireless device 420). If front-end voice server 242 is adapted to recognize the voice of authorized users, then supervisor 410 may simply speak a word or two, for example, his name. Preferably, front-end voice server 242 is a voice-enabled platform that can analyze whether the voice of supervisor 410 matches a known voice exemplar of an authorized user, which is stored in database 248. Alternatively, as discussed above, front-end data server 244 may be used to authenticate supervisor 410 based on, among other information, the password, the user ID, and the MIN of wireless device 420.

In step 510, a determination is made on whether supervisor 410 is an authorized user of the system. If supervisor 410 is authenticated as an authorized user, either by front-end voice server 242 or front-end data server 244, or both, the process goes to step 514. Otherwise, the process goes to step 512, in which supervisor 410 may be given one or more opportunities to enter the correct password or other identity information. The process then repeats steps 506 through 512. Preferably, after a total of three unsuccessful attempts, supervisor 410 is denied access and the process ends.

In step 514, MGI 240 receives a transaction request from supervisor 410. Here, supervisor 410 simply provides a spoken command into wireless device 420. If the spoken command is recognized by front-end voice server 242 as a valid transaction request, the transaction request is forwarded to transaction server 246. For discuss purposes, assume that the transaction request is "Check E-Mails."

In step 516, transaction server 246 obtains a feedback from an appropriate element of resources 450 in response to the transaction request. For example, recognizing that supervisor 410 wishes to check his e-mails, transaction server 246 interacts with e-mail system 454 (see FIG. 4). While logging to e-mail system 454, supervisor 410 can review, forward, reply, and compose e-mails. One or both front-end voice server 242 and front-end data server 244 may interact with wireless device 420 multiple times to receive further spoken commands from supervisor 410 and to provide voice responses or feedbacks to supervisor 410. Preferably, supervisor 410 can also interact with MGI 240 by keying the transaction requests in addition to using his voice.

In step 518, upon receiving a command from supervisor 410 to terminate access to e-mail system 454, MGI 240 asks supervisor 410 whether he wishes to access a different element of resources 450. If supervisor 410 wishes to perform further transactions, the process repeats step 514 through 518. If the supervisor 410 does not have further transaction requests, the process ends.

It must be noted that the above illustration is a simplified, exemplary transaction that shows how a simple transaction may be performed by supervisor 410. Supervisor 410 can perform other transactions using, among other resources, dispatch system 452. As discussed above in conjunction with FIGS. 2 and 3, a large number of different elements or systems can be included as part of resources 450 through which supervisor 410 can conduct transactions using wireless device 420.

An exemplary implementation of MGI 240 has the following characteristics.

Characteristic No. 1. The MGI Pilot is adapted to serve between about 50 and about 60 supervisors. Provisions for the full-scale system can be made to accommodate 1,200 or more supervisors.

Characteristic No. 2. The MGI platform is developed based at least in part on input received from (a) the NOSG staff with regards to the functionality of the platform; (b) software developers and the companies of the supervisors to determine the flow of data from start to finish; (c) the supervisors and the field managers to prioritize the transaction list from most important to least important; (d) SME's of the required systems involved in the MGI platform, which include the IDS, the FO, the PMA, and e-mail systems.

Characteristic No. 3. The MGI can be utilized from anywhere in the wireless coverage area within which the wireless telephones of the supervisors function. The MGI has provisions so that it is scalable to include wireless devices other than wireless telephone. Other wireless devices include, for example, PDAs, I-pagers, and wireless personal computers.

Characteristic No. 4. The MGI system supports at least the following supervisor users: (a) I&M (Installation and Maintenance) managers who use the IDS, GPS and PMA systems; and (b) I&M managers who use any e-mail systems.

Characteristic No. 5. The MGI platform enables each supervisor to perform one or more of the following tasks or transactions:

(a) locate any technician within the work force;
(b) query load;
(c) create a PMA ticket;
(d) identify technicians on high time;
(e) obtain details about any technician and associated vehicle;
(f) assign a new vehicle to a technician;
(g) update a technician's temporary schedule;
(h) complete a safety and service defect form;
(i) complete a safety observation form;
(j) find the nearest technician;
(k) obtain loop qualification system data to determine if customer loop can carry a DSL signal.
(l) manage e-mail accounts;
(m) complete a quality review form;
(n) make sales referrals; and
(o) find out what time a technician leaves his or her work center.

Each of these transactions are separately discussed in the following paragraphs. As used hereinafter, the term "system" is synonymous with the MGI platform.

5(a). Technician Location. The supervisor has the capability to query the system for the latest information on any technicians in his or her maintenance center, as well as technicians associated with a different maintenance center. The system returns the following data or feedback in respond to the query for an individual technician:
- name of the technician;
- address of the technician's previous job;
- address of the technician's current job;
- time dispatched on the current job;
- actual location of the technician obtained from the GPS system;
- duration at actual location;
- status of the technician's vehicle ignition system and the amount of time the ignition system is on;
- whether the current job is a trouble ticket or a service order; and
- if the current job is a service order, the number of lines involved.

5(b). Load. The supervisor has the capability to query the system for information regarding the load for their group, other groups in the same maintenance center, or the entire maintenance center on any given day including the current day and the following day. In the query, the supervisor identifies one or more groups by specific names, day of the week, district, or management area. In response to the query, the system returns the following feedback associated with each group:
- the number of jobs available for dispatch;
- category breakdown (number of service order or trouble ticket jobs);
- the number of customer desired due date (CDDD) jobs remaining each of which is characterized by an order number and a location;
- the number of competitive local exchange carrier (CLEC) jobs left to do in IDS each of which is characterized by an order number and a location; and
- an average number of jobs per scheduled technician;

5(c). PMA Ticket. The supervisor has the capability to create a proactive maintenance action ticket. The specific ticket types may include a helping ticket and a routine ticket.

5(d). Technician High Time. The supervisor has the capability to query the system to determine which technicians within his group or other groups within his district are running over the allotted time for the current job. In response to the query, the system returns a feedback for each technician. The feedback includes the name of the technician and the number of minutes of the technician's high time.

5(e). Technician/Vehicle Detail. The supervisor has the capability to obtain technician or vehicle details by submitting one of the following search terms: a technician name, a vehicle number, a license plate number, and an address and time per individual technician. In response, the system returns the following feedback based upon the initial search criteria: the technician's name; the vehicle number; the vehicle license number; the technician's current street address; and the state of the license plate.

5(f). Assignment of New Vehicle. The supervisor has the capability to assign a new or permanent vehicle to a technician. For a temporary reassignment, the supervisor provides the technician's name and new vehicle number. The system designates a temporary assignment that is effective for the remainder of the day. For a permanent assignment, the supervisor provides the technician's name and a new vehicle number. In response, the system returns the following feedback: validation of name and vehicle number, and confirmation of change in vehicle.

5(g). Temporary Update of Technician's Schedule. The supervisor has the capability to change the current schedule for a technician. The supervisor provides the technician's name to the system. In response, the system returns the following feedback: the technician's name; the output of current status; and the output of new status.

5(h). Safety and Service Defect Form. The supervisor has the capability to complete a safety and service defect form based upon the inspection performed. The supervisor enters the required data for each form. This information can be published to the district web page. The Safety and Service defect forms can be maintained in a local database. In response, the system returns a feedback which includes a confirmation of a successful form.

5(i). Safety Observation Form. The supervisor has the capability to enter comments about a technician safety observation. The supervisor provides the name of the technician and the extent of the technician's safety observation. This information can be published to the district web page. In response, the system returns a feedback which includes a confirmation of a successful form.

5(j). Locate the Nearest Technician. The supervisor has the capability to enter a street address or ticket number to locate the nearest technician. In response, the system returns a feedback which includes the technician's name, the technician current location, and the distance from the street address associated with a ticket. The system can also provide the second and the third closest technicians. It is noted that this functionality may require enhancements be made to the FO system.

5(k). Obtain LOS. The supervisor has the capability to enter a telephone number and retrieve the loop qualification results for a potential ADSL line. In response, the system returns a feedback which includes an answer which is either affirmative or negative.

5(l). Email Access. The supervisor has the capability to manage e-mail accounts from the field. The supervisor is able to select new or old mail from his or her inbox. The basic functions allowed should include Read (including Next, Previous, First, Last, and Again), Skip, Save, Delete, Reply (or Reply All), and Mark Unread. In response, the system returns a feedback which includes the following data for each message: the name of the sender; time sent and date if other than the present day; the subject; the priority (high, medium, or low); the body of message; the file name of any attachments. In addition, the system can also return the following for an e-mail REPLY: record response and deliver as a ".wav" file attachment; deliver as interpreted text message; allow for message to be recorded, played back, re-recorded, paused, resumed, delayed and aborted; and optionally mark as high priority.

5(m). Quality Review Form. The supervisor has the capability to complete a quality review form. This form can be published to the district web page and stored in a database. The supervisor enters the technician's name as well as information related to the quality review. In response, the system returns a feedback which includes a confirmation of a successful form.

5(n). Sales Referrals. The supervisor has the capability to enter information to an appropriate business sales office about a potential sales opportunity associated with a customer. The supervisor enters the telephone number, the best time to call the customer, and the products or services of interest to the customer. In response, the system distributes the information to the correct sales office via e-mail. The customer can be categorized as an individual, a small business, a large business, and the like.

5(o). Out of Gate Query. The supervisor has the capability to query the system to determine what time a technician leaves the work center. In response, the system returns a feedback which includes the following data for an individual technician: the technician's last name; the technician's first name; and the out of gate time. In addition, the supervisor has the capability to query the system to determine the average out of gate time for a group of technicians. In response, the system returns a feedback which includes the average out of gate time for the group of technicians.

Characteristic No. 6. Administration for the MGI platform is done via the MGI Profile Interface. This desktop interface is available for the system administrator and the supervisors. The administrator has the ability to login, change a password, add, modify, or delete a profile of a supervisor or an administrator. All users (including administrators and supervisors) use their common user ID (CUID) and password to enter the various areas of the MGI, according to their pre established user profiles.

6(a). Administrator Login. For administrator logins, the system displays the MGI Profile Interface login GUI to the administrator. During login, the system verifies user access to MGI Profile Interface Administration. The system edits and checks required data fields for the CUID and password. The system modifies password characters supplied using asterisk masking. Based upon the administrator's CUID and password, the system validates the user and grants access or denies further access to controlled areas of the system. The system validates the administrator and returns a feedback which includes either successful or a failed login attempt notification. Upon successful submission of login credentials, the system grants the administrator access to other security-controlled areas of MGI Administration. In the event of an unsuccessful login, the existing CUID and password on screen data are cleared. The administrator is allowed to re-enter the CUID and password data after an initial unsuccessful login. If the administrator fails to login, for example, three consecutive attempts, the system disables or ignores any further attempt made by the administrator. Rules for editing the CUID and Password are summarized as follows:

| Entity Name | Format | Length (number of characters) | Validation/Range |
| --- | --- | --- | --- |
| Admin Login Edit Rules | | | |
| CUID | Alpha | 7 | No Vowels Allowed |
| Password | Alpha-numeric with special characters | 8–12 | A password must contain at least one alphabetic, one numeric, and one special character. The valid special characters are: ,./< >?;':[ ]{ }\\|=-`~!@#$%^&*( )_+ |

6(b). Changing Administrator Password. After successful login, the administrator has the capability to change passwords at any time. For a particular administrator, changing the passwords in the MGI system does not interfere or impact interactions with other company systems. The system checks the data fields associated with the existing password, the new password, and a redundant typing of the new password. The system modifies password characters supplied with asterisk masking. The system verifies by comparison that the user supplied new and redundant passwords are equivalent and informs the administrator if there are any discrepancies. Once the administrator enters the new and old passwords, the administrator has the capability to submit a change password request with the supplied data. When the administrator requests to change the password, the system conducts old password validation based upon the original password and CUID provided by the administrator during initial login. The system returns a feedback which includes a successful or failed password change attempt. If the change is successful, the system returns a feedback which includes a visual confirmation. In the event of an unsuccessful password change, the system notifies the administrator. The CUID and password fields are cleared. Then, the administrator is permitted to re-enter the password information and resubmit the password change request.

| Entity Name | Format | Length | Validation/Range |
| --- | --- | --- | --- |
| Password Change Edit Rules | | | |
| Current Password New Password Redundant New Password | Alpha-numeric with special characters | 8–12 | A password must contain at least one alphabetic, one numeric, and one special character. The valid special characters are: ,./< >?;':[ ]{ }\\|=-`~!@#$%^&*( )_+ |

6(c). Adding a Supervisor. To add or authorize access to a supervisor, the system displays the MGI Platform Interface. The administrator logs in to the system as detailed above. The system displays the CUID field. Based upon the information provided in the field, the system creates a profile. The system generates a feedback which includes a confirmation to the administrator indicating a successful addition to the system. The system updates the front-end database that a new user has been added to the system. Rules for adding a supervisor to the system are as follows:

| Entity Name | Format | Length | Validation/Range |
| --- | --- | --- | --- |
| Adding a Supervisor | | | |
| CUID | Alpha | 7 | No vowels allowed |
| State | Alphabetic | 2 | Two letter state abbreviation. |

6(d). Modifying a Supervisor Profile. To modify a supervisor profile, the system displays the MGI Platform Interface. The administrator logs in to the system as detailed above. The system displays a field for the administrator to enter a search criterion of a supervisor whose profile is to be modified to display the supervisor's profile. The system gives the administrator the capability to search for a supervisor profile based upon one or more of the following criteria related to the supervisor, including, CUID, Last Name, GPS Database, IDS Database, and State. The system displays the results of the profile search or display the results. The system gives the functionality to select a profile and edit either one profile or a group of profiles, as needed. The administrator edits the profile as needed. The system saves and updates the modification to the profile. The system generates a feedback which includes a confirmation to the administrator indicating a successful modification to the profile. The system generates notification to the front-end indicating modification in the profile.

6(e). Deleting a Supervisor Profile. To delete a supervisor profile, the system displays the MGI Platform Interface. The administrator logs in to the system as detailed above. The system displays a field for the administrator to enter a search criterion of a supervisor whose profile is to be modified to display the supervisor's profile. The system gives the administrator the capability to search for a supervisor profile based upon one or more of the following criteria related to the supervisor, including, CUID, Last Name, First Name, City, and State. The system displays the results of the profile search. The system displays a profile for deletion. The system displays a message re-confirming the profile delete. The system deletes the profile from the MGI system. The system generates a feedback which includes a confirmation to the administrator indicating a successful profile deletion. The system generates a notification to the front-end indicating a user has been deleted from the system.

6(f). Adding a New Administrator. To add a new administrator, the system displays the MGI Platform interface to the administrator. The administrator logs in to the system as detailed in section above. The system displays a field to enter the CUID. This CUID serves as the basis of the administrator profile. The system sends or displays a feedback which includes a confirmation of the added new administrator.

6(g). Modifying an Existing Administrator Profile. To modify an existing administrator's profile, the system displays the MGI Platform interface to the administrator. The administrator logs into the system as detailed above. The system displays a field to enter the CUID for modification. The system displays an editable profile, based upon the CUID. The system saves the edited existing administrator profile.

6(h). Deleting an Existing Administrator Profile. To delete an existing administrator profile, the system displays the MGI platform interface to the administrator. The administrator logs into the system as detailed above. The system prompts the administrator to enter the CUID for deletion. The system generates a feedback which includes a confirmation message prior to deletion. The system deletes the entered CUID and saves the information accordingly.

6(i). Supervisor Loin. To enable a supervisor to login, the system displays the MGI Profile Interface login GUI to the supervisor. During login, the system verifies user access to MGI Profile Interface. The system edits and checks required data fields for the CUID and password. The system modifies password characters supplied using asterisk masking. Based upon the supervisor's CUID and password, the system validates the user and grants access or denies further access to controlled areas of the system. The system validates the supervisor and returns a feedback which includes an indication on either successful or a failed login attempt notification. Upon successful submission of login credentials, the system grants the supervisor access to other security-controlled areas of MGI Profile Interface (namely, profile modification and change password). In the event of an unsuccessful login, the existing CUID and password on screen data are cleared. The supervisor is allowed to re-enter the CUID and password data after an initial unsuccessful login. If the supervisor fails to login for three consecutive attempts, the system disables further attempts. Rules for supervisor login edit are as follows:

Supervisor Login Edit Rules

| Entity Name | Format | Length | Validation/Range |
|---|---|---|---|
| CUID | Alpha | 7 | No Vowels Allowed |
| Password | Alpha-numeric with special characters | 8–12 | A password must contain at least one alphabetic, one numeric, and one special character. The valid special characters are: ,./< >?;':[ ]{ }\\|=-`~!@#$%^&*( )_+ |

6(j). Changing Supervisor Password. After successful login, the supervisor has the capability to change passwords at any time. For a particular supervisor, changing the passwords in the MGI system does not interfere or impact interactions with other company systems. The system checks the data fields associated with the existing password, the new password, and a redundant typing of the new password. The system modifies password characters supplied with asterisk masking. The system verifies by comparison that the user supplied new and redundant passwords are equivalent and inform the supervisor if there are any discrepancies. Once the supervisor enters the new and old passwords, the supervisor has the capability to submit a change password request with the supplied data. When the supervisor requests to change the password, the system conducts old password validation abased upon the original password and CUID provided by the supervisor during initial login. The system returns a feedback which includes a successful or failed password change attempt. If the change is successful, the system returns a visual confirmation. In the event of an unsuccessful password change, the system notifies the supervisor. The CUID and password fields are cleared. Then, the supervisor will be permitted to re-enter the password information and resubmit the password change request.

Password Change Edit Rules

| Entity Name | Format | Length | Validation/Range |
|---|---|---|---|
| Current Password New Password Redundant New Password | Alpha-numeric with special characters | 8–12 | A password must contain at least one alphabetic, one numeric, and one special character. The valid special characters are: ,./< >?;':[ ]{ }\\|=-`~!@#$%^&*( )_+ |

6(k). Modifying a Supervisor Profile. To modify a supervisor profile, the system displays the MGI Platform Interface. The supervisor logs in to the system as detailed above. The Supervisor selects the "Modify Profile" option from the MGI Platform Interface option. The Supervisor has the capability to edit one or more elements of his/her profile, including: First name; Last name; Middle Initial; Telephone number; interactive pager address; Pager number; Email address; Group ID number; and Mobile phone number. The system saves and updates the modifications to the profile. The system generates a feedback which includes a confirmation to the administrator and supervisor indicating a successful modification to the profile. The system generates notification to the front-end indicating a change to the supervisor's profile. If the supervisor fails to supply the correct information to change the profile, the system generates a message reflecting the problem with the attempted change.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for enabling a user to perform office transactions from a field location comprising:
   receiving a login request from a user through a remote device;
   determining whether the user is an authorized user;
   receiving a transaction request from the user if the user is an authorized user;
   the user interacting with one or more resources trough a mobile gateway interface to execute the transaction request; and
   providing a feedback to the user in response to the transaction request through the remote device;
   wherein the resources include one or more systems configured to:
      provide the location of a technician in the field;
   wherein the mobile gateway interface is adapted to determine whether the user is an authorized user of the system;
   wherein the mobile gateway interface comprises a front-end voice server, a front-end data server, and a transaction server;
   wherein the front-end voice server determines if the user is an authorized user in response to the user's voice matching a voice exemplar of an authorized user;
   wherein the front-end data server determines if the user is an authorized user in response to a user password matching a password of an authorized user.

2. The method of claim 1, wherein the resources include one or more systems configured to provide information concerning the technician's current job.

3. The method of claim 1 wherein the resources include one or more systems configured to alter the technician's schedule.

4. The method of claim 1, wherein the resources include one or more systems configured to alter vehicle assignment for the technician.

5. The method of claim 1, wherein the resources include one or more systems configured to implement testing of a communications network.

6. The method of claim 1, wherein the resources include one or more of a legacy system, an Intranet, and the Internet.

7. The method of claim 1, wherein the resources includes one or more of a security information management system, an outside plant construction management system, a loop qualification system, a work activity statistical sampling system, a fleet operations support system, a fleet optimizer system, an integrated technician performance system, a network monitoring and analysis system, a proactive maintenance administration system, an integrated dispatch system, a mechanized time reporting system, an employee scheduling program, an open system interconnect platform, and an outside plant engineering design system.

8. The method of claim 1, wherein the transaction request relates to one or more of
   (a) locating a technician;
   (b) querying load associated with a technician;
   (c) creating a proactive maintenance action ticket;
   (d) identifying a technician on high time;
   (e) obtaining details about a technician and a vehicle associated with the technician;
   (f) assigning a new vehicle to a technician;
   (g) updating a technician's temporary schedule;
   (h) completing a safety and service defect form;
   (i) completing a safety observation form;
   (j) finding a technician nearest to a field location;
   (k) obtaining loop qualification results;
   (l) managing e-mail accounts;
   (m) completing a quality review form;
   (n) making sales referrals; and
   (o) finding out what time a technician leaves a work center.

9. A system for enabling a user to perform office transactions comprising:
   a remote device operable by the user from a field location;
   a mobile gateway interface adapted to interface with the remote device during a communications session; and
   one or more resources adapted to interact with the remote device through
   the mobile gateway interface during the communications session,
   wherein the user performs an office transaction through the resources using the remote device via the mobile gateway interface, wherein the office transaction involves one or more technicians associated with the user;
   wherein the resources include one or more systems configured to:
      provide the location of a technician in the field;
   wherein the mobile gateway interface is adapted to determine whether the user is an authorized user of the system;
   wherein the mobile gateway interface comprises a front-end voice server, a front-end data server, and a transaction server;
   wherein the front-end voice server determines if the user is an authorized user in response to the user's voice matching a voice exemplar of an authorized user;
   wherein the front-end data server determines if the user is an authorized user in response to a user password matching a password of an authorized user.

10. The system of claim 9, wherein the resources include one or more systems configured to provide information concerning the technician's current job.

11. The system of claim 9, wherein the resources include one or more systems configured to alter the technician's schedule.

12. The system of claim 9, wherein the resources include one or more systems configured to alter vehicle assignment for the technician.

13. The system of claim 9, wherein the mobile gateway interface further comprises a database, wherein the database is accessible by one or both of the front-end voice server and the front-end data server, and wherein the database includes user information associated with the user.

14. The system of claim 9, wherein the transaction server processes a transaction request received from the user using the remote device if the user is an authorized user of the system.

15. The system of claim 9 wherein the resources include one or more systems configured to implement testing of a communications network.

16. A mobile gateway interface for enabling users to perform office transactions by using a remote device at a field location comprising:
- a front-end voice server and a front-end data server adapted to determine whether a user who submits a login request through the remote device during a communications session is an authorized user;
- wherein the front-end voice server determines if the user is an authorized user in response to the user's voice matching a voice exemplar of an authorized user;
- wherein the front-end data server determines if the user is an authorized user in response to a user password matching a password of an authorized user; and
  - a transaction server coupled to the front-end voice server one or more front-end servers and a front-end data server, wherein the transaction server interfaces between the remote device and one or more resources during the communications session to process a transaction request received from the user if the user is an authorized user, and wherein the resources are related to technicians associated with the user, wherein the resources include one or more systems configured to: provide the location of a technician in the field.

17. The mobile gateway interface of claim 16, wherein the resources includes one or more of a security information management system, an outside plant construction management system, a loop qualification system, a work activity statistical sampling system, a fleet operations support system, a fleet optimizer system, an integrated technician performance system, a network monitoring and analysis system, a proactive maintenance administration system, an integrated dispatch system, a mechanized time reporting system, an employee scheduling program, an open system interconnect platform, and an outside plant engineering design system.

18. The mobile gateway interface of claim 16, wherein one of the front-end servers is a voice server.

19. The mobile gateway interface of claim 16, wherein one of the front-end servers is a data server.

20. The mobile gateway interface of claim 16, further comprising a database accessible to the front-end servers, wherein the database includes user information associated with authorized users of the mobile gateway interface.

21. The mobile gateway interface of claim 16, wherein the resources include one or more systems configured to provide information concerning the technician's current job.

22. The mobile gateway interface of claim 16, wherein the resources include one or more systems configured to alter the technician's schedule.

23. The mobile gateway interface of claim 16, wherein the resources include one or more systems configured to alter vehicle assignment for the technician.

24. The mobile gateway interface of claim 16, wherein the resources include one or more systems configured to implement testing of a communications network.

25. A computer program product for enabling a user to perform office transactions from a field location, the computer program product comprising:
- a storage medium readable by a processing circuit and storing instructions for execution by the processing circuit for facilitating a method comprising:
  - receiving a login request from a user through a remote device;
  - determining whether the user is an authorized user;
  - receiving a transaction request from the user if the user is an authorized user;
  - the user interacting with one or more resources through a mobile gateway interface to execute the transaction request; and
  - providing a feedback to the user in response to the transaction request through the remote device;
  - wherein the resources include one or more systems configured to:
  - provide the location of a technician in the field;
- wherein the mobile gateway interface is adapted to determine whether the user is an authorized user of the system;
- wherein the mobile gateway interface comprises a front-end voice server, a front-end data server, and a transaction server;
- wherein the front-end voice server determines if the user is an authorized user in response to the user's voice matching a voice exemplar of an authorized user;
- wherein the front-end data server determines if the user is an authorized user in response to a user password matching a password of an authorized user.

* * * * *